No. 718,571. PATENTED JAN. 13, 1903.
R. HOODLESS.
WEEDING IMPLEMENT.
APPLICATION FILED MAR. 7, 1902.
NO MODEL.
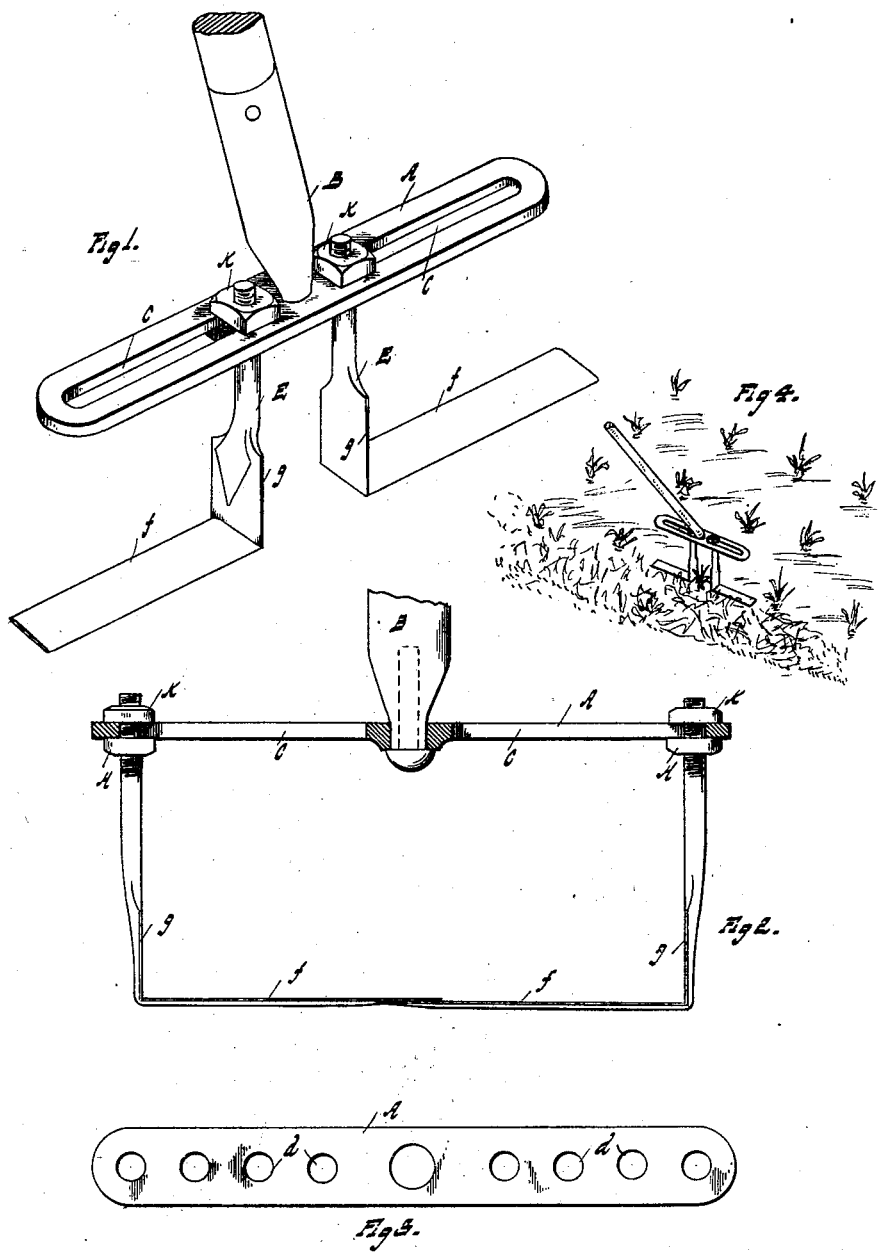

UNITED STATES PATENT OFFICE.

RICHARD HOODLESS, OF CHICAGO, ILLINOIS, ASSIGNOR TO ALEXANDER T. FISCHER, OF DETROIT, MICHIGAN.

WEEDING IMPLEMENT.

SPECIFICATION forming part of Letters Patent No. 718,571, dated January 13, 1903.

Application filed March 7, 1902. Serial No. 97,039. (No model.)

*To all whom it may concern:*

Be it known that I, RICHARD HOODLESS, a citizen of the United States, residing at Chicago, county of Cook, State of Illinois, have invented a certain new and useful Improvement in Weeding Implements; and I declare the following to be a full, clear, and exact description of the invention, such as will enable others skilled in the art to which it pertains to make and use the same, reference being had to the accompanying drawings, which form a part of this specification.

This invention relates to hoes, and has for its object an improved form of hoe or weeding implement adapted for various purposes and adapted to be used in various ways.

In the drawings, Figure 1 is a perspective with blades in one position. Fig. 2 is an elevation with blades in a second position. Fig. 3 is a view of a blade-holder. Fig. 4 shows the operation of the weeder.

A indicates the blade-holder, which consists of a blade provided with a central tang B, that projects from the middle of one face. At each side of the tang the blade projects and is provided with means for holding the shanks of hoe-blades. These means may consist of an oblong slot C, or they may consist of a series of holes *d*. The hoe-blade consists of a shank E, provided with a portion that is adapted to engage through the hole in the plate and with a blade part *f*, which is bent at substantially right angles to the shank and is preferably sharpened on both edges and at the end edge. A part of the shank next to the blade is widened to the width of the blade and is provided on each of its vertical edges with sharpened cutting edges *g*.

Preferably two blades are used with each holder A, and these may be adjusted to any position within the limits of the holder A. They may be turned with the blades out, as shown in Fig. 1, or with the blades pointing toward each other, as shown in Fig. 2, and may be spaced the one from the other to any desired width within the limits above mentioned. The blades are secured in place by running a nut H on a threaded shank until a threaded neck extends beyond the nut long enough to engage through the holder and through a holding-nut K.

What I claim is—

1. In a weeding implement, the combination with a holder provided with means for adjustably securing the shanks of weeding-blades, and a weeding-blade provided with a threaded shank and a cutting-blade part at right angles thereto sharpened on both sides and secured to the holder, substantially as described.

2. In a weeding implement, the combination of a holder provided with apertures arranged to hold the shanks of weeding-blades secured to said holder at adjustable distances, and weeding-blades, each of said blades being provided with a threaded shank and with a cutting part at right angles to said shank and with a cutting-section on each shank, substantially as described.

3. In a weeding implement, the combination of a holder with two blades secured thereto, the blades being each provided with a threaded shank and with a cutting-blade at right angles thereto to engage the holder and being adapted to engage in the holder with the two blades pointing toward each other or with the two blades pointing away from each other, substantially as described.

In testimony whereof I sign this specification in the presence of two witnesses.

RICHARD HOODLESS.

Witnesses:
W. O. NORTH,
H. H. SANDERS.